United States Patent
Lin et al.

(10) Patent No.: US 9,281,751 B2
(45) Date of Patent: Mar. 8, 2016

(54) POWER CONVERTER WITH PRIMARY-SIDE FEEDBACK CONTROL AND VOLTAGE CONTROL METHOD THEREOF

(71) Applicant: LITE-ON TECHNOLOGY CORP., Taipei (TW)

(72) Inventors: Chien-Yu Lin, Taipei (TW); Wei-Lieh Lai, Taipei (TW); Ya-Jhe Liu, Taipei (TW); Yu-Kang Lo, Taipei (TW); Huang-Jen Chiu, Taipei (TW); Cheng-Ting Lin, Taipei (TW)

(73) Assignee: Lite-On Technology Corp., Taipei (TW)

( * ) Notice: Subject to any disclaimer, the term of this patent is extended or adjusted under 35 U.S.C. 154(b) by 108 days.

(21) Appl. No.: 14/039,137

(22) Filed: Sep. 27, 2013

(65) Prior Publication Data

US 2014/0119066 A1    May 1, 2014

(30) Foreign Application Priority Data

Oct. 30, 2012   (TW) .............................. 101140099 A

(51) Int. Cl.
*H02M 3/335*   (2006.01)

(52) U.S. Cl.
CPC ................................ *H02M 3/33523* (2013.01)

(58) Field of Classification Search
CPC ......... H02M 3/00; H02M 3/28; H02M 3/285; H02M 3/337; G05F 1/70; H01F 2038/006; H02J 1/102

USPC ......... 363/17–20, 21.01, 21.08, 21.12, 21.17, 363/21.18; 323/266, 267, 271, 282–288; 315/210, 224, 291, 312

See application file for complete search history.

(56) References Cited

U.S. PATENT DOCUMENTS

| | | | | |
|---|---|---|---|---|
| 6,459,594 | B1 * | 10/2002 | Tsuji | H02M 3/33507 307/125 |
| 7,057,907 | B2 * | 6/2006 | Oh | H02M 3/33515 363/21.01 |
| 7,876,583 | B2 * | 1/2011 | Polivka | H02M 3/33523 363/21.14 |
| 8,102,679 | B2 * | 1/2012 | Gong | H02M 3/156 363/21.04 |
| 8,213,194 | B2 * | 7/2012 | Koutensky | 363/21.18 |
| 8,824,172 | B2 * | 9/2014 | Chen | H02M 3/33507 363/21.12 |
| 2004/0264216 | A1 * | 12/2004 | Mednik et al. | 363/18 |

* cited by examiner

*Primary Examiner* — Rajnikant Patel
(74) *Attorney, Agent, or Firm* — Rosenberg, Klein & Lee

(57) ABSTRACT

A voltage control method for a power converter includes: acquiring a current of a first primary side winding of a transformer circuit of the power converter; integrating the acquired current to obtain an average voltage; comparing the average voltage with a reflected voltage associated with a current of a secondary side winding of the transformer circuit; and adjusting a duty cycle of a switch of the power converter based on an obtained comparison result for adjustment of an output voltage of the power converter.

18 Claims, 12 Drawing Sheets

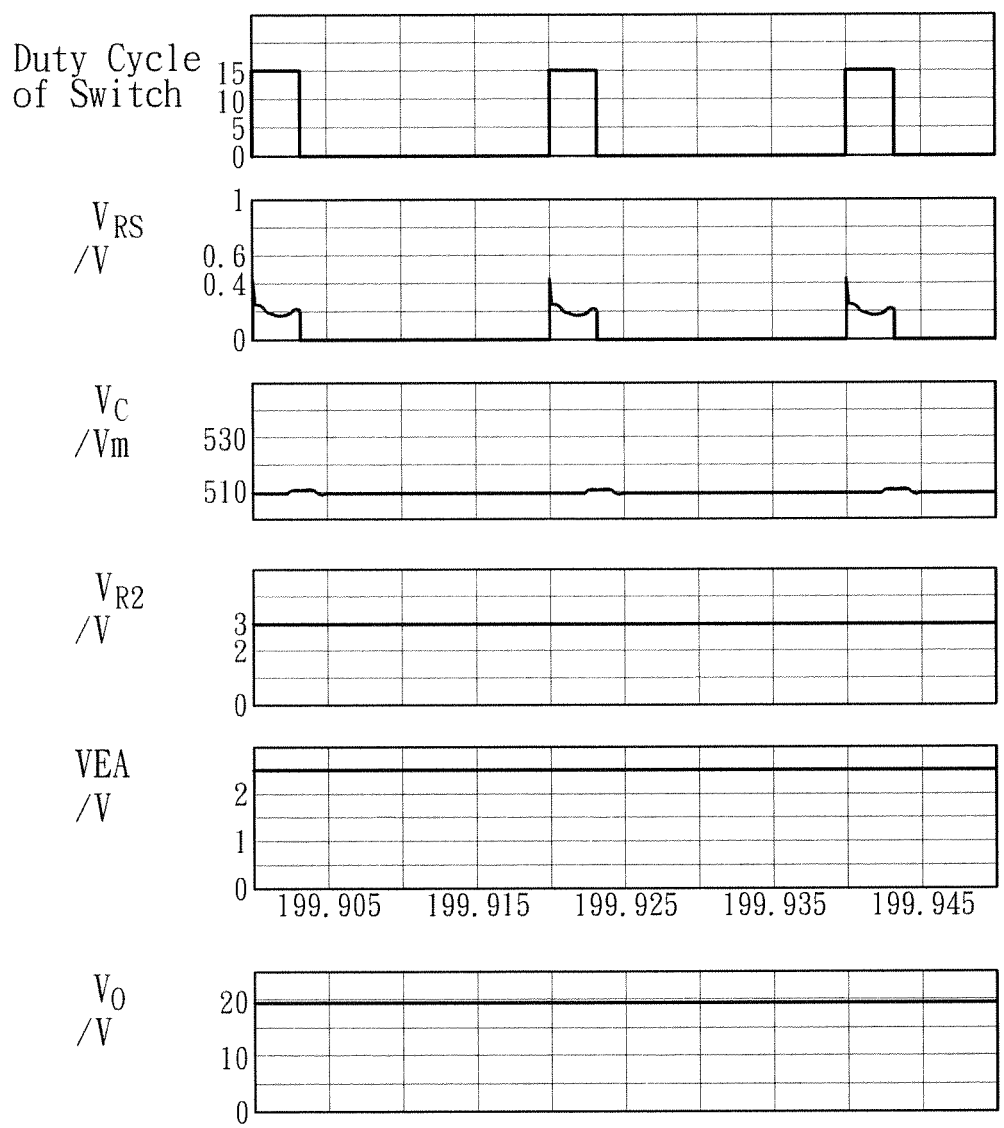
F I G. 4

… (US 9,281,751 B2)

POWER CONVERTER WITH PRIMARY-SIDE FEEDBACK CONTROL AND VOLTAGE CONTROL METHOD THEREOF

CROSS-REFERENCE TO RELATED APPLICATION

This application claims priority to Taiwanese Application No. 101140099, filed on Oct. 30, 2012.

BACKGROUND OF THE INVENTION

1. Field of the Invention

The invention relates to a power converter, and more particularly to a power converter with primary-side feedback control and a voltage control method thereof, which are suitable for operation in continuous conduction mode, discontinuous conduction mode, or boundary conduction mode.

2. Description of the Related Art

Power converters have been commonly used in power circuits of various electronic devices. As shown in FIG. 1, the known voltage converter 900 employs a secondary side feedback control architecture that requires many circuit elements, resulting in great circuit size and complexity in circuit design. In addition, a current transfer ratio (CTR) of a low-cost optical coupler 910 of the power converter 900 may severely decay with temperature and time, thereby resulting in low reliability of the circuit. Therefore, some power converters employ primary side regulation (PSR) techniques to simplify the circuit and reduce the cost.

However, under the conventional PSR control, the power converter operates in a discontinuous conduction mode to detect voltage waveform of the primary side winding to control the transistor duty cycle for stabilizing an output voltage, which is only suitable for low-power applications (under 15 W). In other words, when the output load current is large, the output voltage may have large variations that may adversely affect voltage regulation, thus being unable to satisfy requirements of high-power voltage converters.

SUMMARY OF THE INVENTION

Therefore, an object of the present invention is to provide a voltage control method suitable for operation in discontinuous conduction mode, continuous conduction mode, or boundary conduction mode.

According to one aspect of the present invention, there is provided a voltage control method for a power converter that includes a transformer circuit. The transformer circuit includes a first primary side winding, a second primary side winding, and a secondary side winding. The voltage control method comprises:

a) acquiring a current of the first primary side winding of the power converter;

b) integrating the current acquired in step a) to obtain an average voltage;

c) comparing the average voltage obtained in step b) with a reflected voltage associated with a current of the secondary side winding of the transformer circuit; and d) adjusting a duty cycle of a switch of the power converter based on a comparison result obtained in step c) for adjustment of an output voltage of the power converter.

Another object of the present invention is to provide a power converter adapted to implement the voltage control method of the present invention.

According to another aspect of the present invention, a power converter comprises:

a flyback voltage converting circuit including:
a transformer circuit including a first primary side winding, a second primary side winding, and a secondary side winding, the first primary side winding having a first terminal disposed to receive an input voltage;
a first diode having an anode coupled to the secondary side winding, and a cathode;
an output capacitor having a first terminal coupled to the cathode of the first diode, and a grounded second terminal;
a switch having a first terminal coupled to a second terminal of the first primary side winding, a second terminal, and a control terminal; and
an output voltage sampling circuit coupled to the second primary side winding for receiving a reflected current of the second primary side winding, which is proportional to a current of the secondary side winding, and for generating a reflected voltage corresponding to the reflected current;

a feedback control circuit coupled to the flyback voltage converting circuit and configured to acquire and integrate a current flowing through the first primary side winding as a result of the input voltage to obtain an average voltage, and to compare the average voltage with the reflected voltage to obtain a comparison result; and a pulse width modulation module coupled to the feedback control circuit for receiving the comparison result therefrom and configured to adjust a duty cycle of the switch based on the comparison result for adjustment of an output voltage of the power converter.

BRIEF DESCRIPTION OF THE DRAWINGS

Other features and advantages of the present invention will become apparent in the following detailed description of the preferred embodiments with reference to the accompanying drawings, of which:

FIG. 4 is a set of timing diagrams showing waveforms from the first preferred embodiment operating under a light load;

DETAILED DESCRIPTION OF THE PREFERRED EMBODIMENTS

Figure 1:
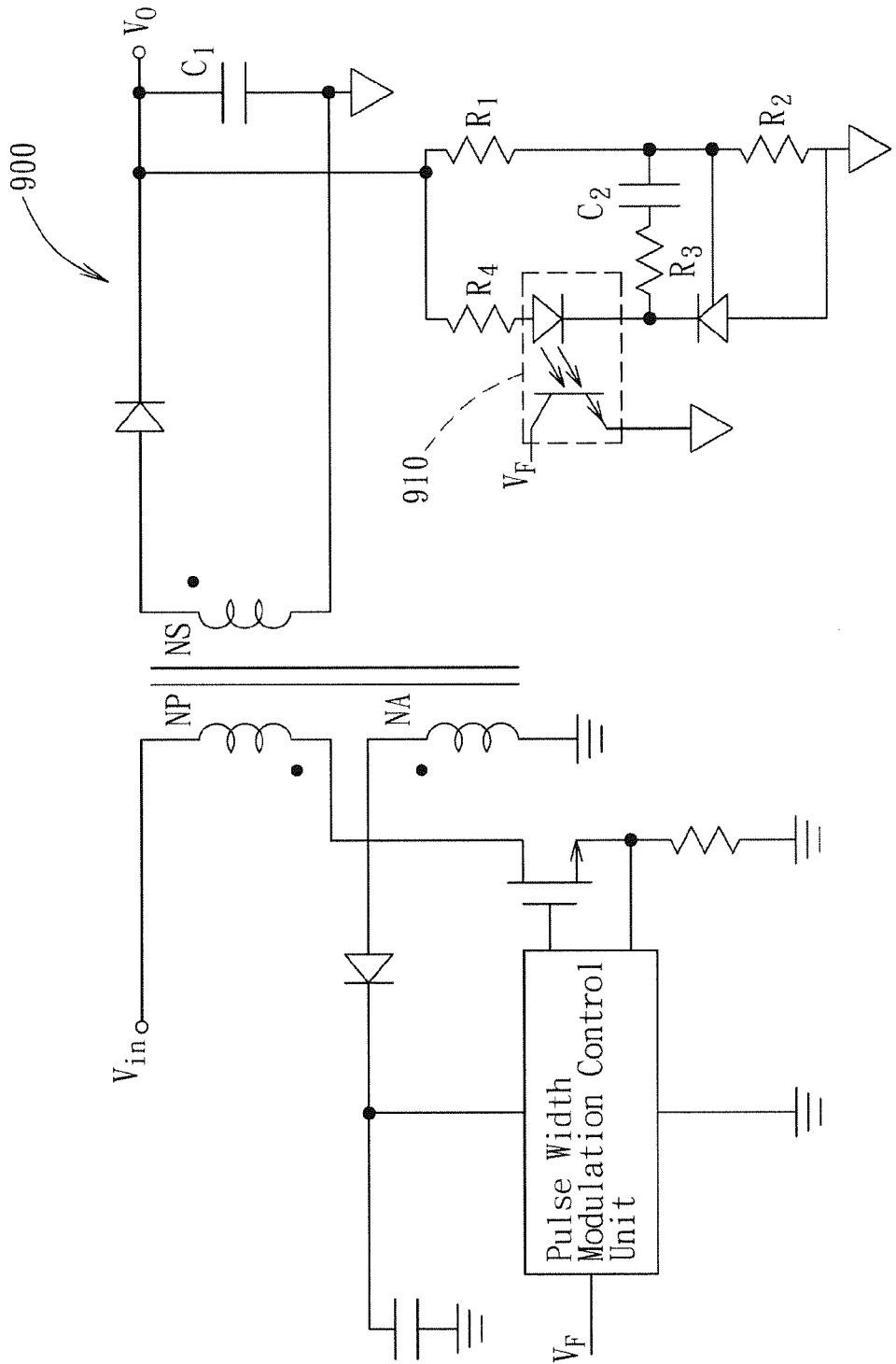
FIG. 1 is a schematic circuit diagram illustrating circuit architecture of a conventional power converter.
Figure 2:
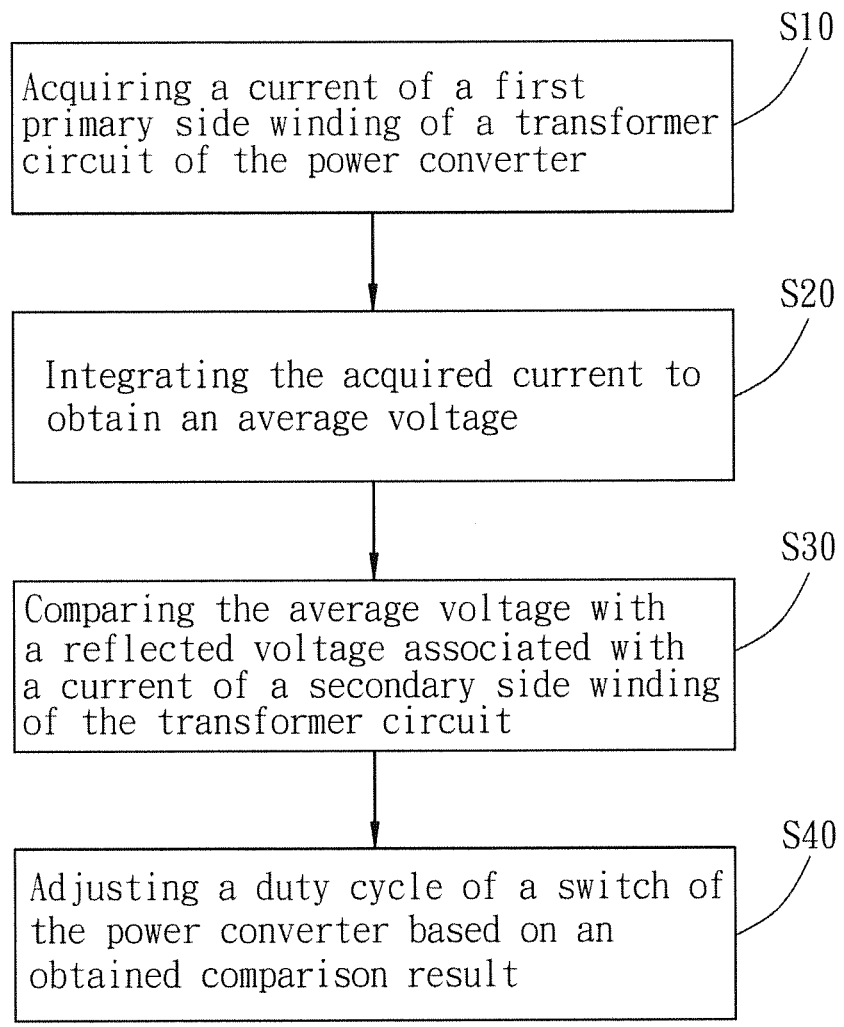
FIG. 2 is a flow chart illustrating steps of the voltage control method according to the present invention.
Figure 3:
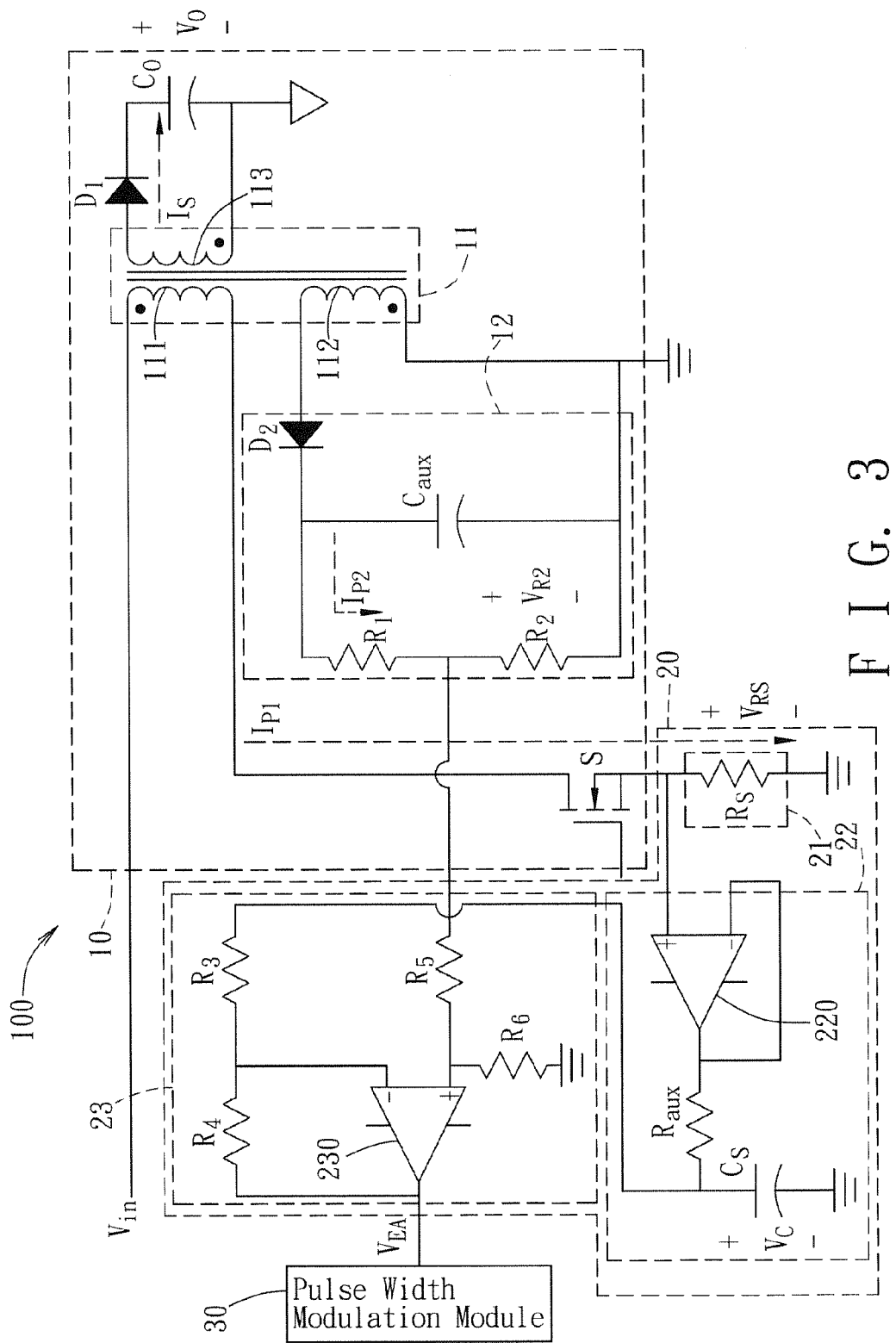
FIG. 3 is a schematic circuit diagram of a first preferred embodiment of the power converter according to the present invention.

Referring to FIGS. 2 and 3, the preferred embodiment of the voltage control method and the first preferred embodiment of the power converter 100 according to the present invention are respectively shown.

In this embodiment, the power converter 100 comprises a flyback voltage converting circuit 10 and a feedback control circuit 20.

The flyback voltage converting circuit 10 includes a transformer circuit 11, a first diode $D_1$, an output capacitor $C_o$, a switch S, and an output voltage sampling circuit 12.

The transformer circuit 11 includes a first primary side winding 111, a second primary side winding 112, and a secondary side winding 113. The first primary side winding 111 has a first terminal disposed to receive an input voltage $V_{in}$, and a second terminal coupled to the switch S. For example, the switch S can be an N-type metal-oxide-semiconductor field-effect transistor (MOSFET), and has a drain terminal (first terminal) coupled to the second terminal of the first primary side winding 111, a gate terminal (control terminal), and a source terminal (second terminal) coupled to the feedback control circuit 20. The first diode $D_1$ has an anode coupled to the secondary side winding 113, and a cathode coupled to a first terminal of the output capacitor $C_o$. The output capacitor $C_o$ further has a grounded second terminal, and is used to generate an output voltage $V_o$ across the first and second terminals thereof.

The output voltage sampling circuit 12 includes a second diode $D_2$, an auxiliary capacitor $C_{aux}$, a first resistor $R_1$, and a second resistor $R_2$. The second diode $D_2$ has an anode coupled to a first terminal of the second primary side winding 112, and a cathode coupled to a first terminal of the auxiliary capacitor $C_{aux}$. Each of the second primary side winding 112 and the auxiliary capacitor $C_{aux}$ has a grounded second terminal. The first resistor $R_1$ has a first terminal coupled to the cathode of the second diode $D_2$, and a second terminal coupled to a first terminal of the second resistor $R_2$. The second resistor $R_2$ further has a grounded second terminal. The second primary side winding 112 reflects a reflected current $I_{P2}$ which is proportional to a current $I_S$ of the secondary side winding 113. A ratio between the reflected current $I_{P2}$ and the current $I_S$ flowing through the secondary side winding 113 is associated with a ratio of a number of turns of wire in the secondary side winding 113 to a number of turns of wire in the second primary side winding 112. The first resistor $R_1$ of the output voltage sampling circuit 12 receives the reflected current $I_{P2}$, thereby generating a reflected voltage $V_{R2}$ corresponding to the reflected current $I_{P2}$ at a connection point between the first resistor $R_1$ and the second resistor $R_2$.

The feedback control circuit 20 includes a current sampling circuit 21, an integrator circuit 22, and a difference computing circuit 23.

The current sampling circuit 21 includes a sampling resistor $R_S$ having a first terminal coupled to the source terminal (second terminal) of the switch S of the flyback voltage converting circuit 10, and a grounded second terminal. The sampling resistor $R_S$ is used to receive a current $I_{P1}$ flowing through the first primary side winding 111. The current $I_{P1}$ is a current proportional to the current $I_S$ of the secondary side winding 113.

The integrator circuit 22 includes a first operational amplifier (OP) 220, an auxiliary resistor $R_{aux}$, and an integrator capacitor $C_S$. The first operational amplifier 220 has a non-inverting terminal (first terminal) coupled to the first terminal of the sampling resistor $R_S$, an inverting terminal (second terminal), and an output terminal coupled to the inverting terminal thereof. The auxiliary resistor $R_{aux}$ has a first terminal coupled to the output terminal of the first operational amplifier 220, and a second terminal coupled to a first terminal of the integrator capacitor $C_S$. The integrator capacitor $C_S$ further has a grounded second terminal. The integrator circuit 22 is configured to integrate the current $I_{P1}$ received by the current sampling circuit 21 to generate an average voltage $V_C$.

The difference computing circuit 23 is a subtractor in this embodiment, and includes a second operational amplifier 230, a third resistor $R_3$, a fourth resistor $R_4$, a fifth resistor $R_5$ and a sixth resistor $R_6$. The second operational amplifier 230 has a non-inverting terminal (first terminal), an inverting terminal (second terminal), and an output terminal coupled to a pulse width modulation (PWM) module 30. The third resistor $R_3$ has a first terminal coupled to the integrator capacitor $C_S$, and a second terminal coupled to the inverting terminal of the second operational amplifier 230. The fourth resistor $R_4$ is coupled between the inverting terminal and the output terminal of the second operational amplifier 230. The fifth resistor $R_5$ has a first terminal coupled to the connection point between the first resistor $R_1$ and the second resistor $R_2$, and a second terminal coupled to the non-inverting terminal of the second operational amplifier 230. The sixth resistor $R_6$ has a first terminal coupled to the non-inverting terminal of the second operational amplifier 230, and a grounded second terminal. The difference computing circuit 23 is configured to perform a subtraction operation between the reflected voltage $V_{R2}$ and the average voltage $V_C$ to obtain a difference voltage $V_{EA}$. Therefore, when the switch S conducts, the integrator circuit 22 integrates the current $I_{P1}$ received by the current sampling circuit 21 from the first primary side winding 111, so as to generate the average voltage $V_C$. Thereafter, the difference computing circuit 23 obtains the difference voltage $V_{EA}$, and the pulse width modulation module 30 controls the switch S to be turned on or cut off (i.e., duty ratio of the switch S) according to the difference voltage $V_{EA}$ to adjust the output voltage $V_o$, thereby promoting voltage regulation.

In this embodiment, the difference voltage $V_{EA}$ obtained by the difference computing circuit 23 satisfies the following equation:

$$V_{EA} = (V_{R2} - V_C) \times \frac{R4}{R3}$$

In this embodiment, the fifth resistor $R_5$ and the third resistor $R_3$ have the same resistance, and the sixth resistor $R_6$ and the fourth resistor $R_4$ have the same resistance, so that a ratio between the difference of the reflected voltage $V_{R2}$ and the average voltage $V_C$ and the difference voltage $V_{EA}$ is only associated with the third resistor $R_3$ and the fourth resistor $R_4$. When the current $I_S$ of the secondary side winding 113 is increased, the current $I_{P1}$ of the first primary side winding 111 is also increased, so that the voltage $V_{RS}$ across the sampling resistor $R_S$ is increased. The average voltage $V_C$ is increased due to increase of the voltage $V_{RS}$, resulting in reduction of the difference voltage $V_{EA}$, such that the pulse width modulation module 30 increases the duty cycle of the switch S. On the other hand, when the current $I_S$ of the secondary side winding 113 is reduced, the current $I_{P1}$ of the first primary side winding 111 is also reduced, so that the voltage $V_{RS}$ across the sampling resistor $R_S$ is reduced. The average voltage $V_C$ is reduced due to reduction of the voltage $V_{RS}$, resulting in increase of the difference voltage $V_{EA}$, such that the pulse width modulation module 30 reduces the duty cycle of the switch S. As a result, the feedback control circuit 20 can thus effectively adjust the output voltage $V_o$ and improve the voltage regulation.

In other words, the feedback control circuit 20 of this embodiment uses the sampling resistor $R_S$ of the current sampling circuit 21 to acquire the current $I_{P1}$ of the first primary side winding 111 of the transformer circuit 11 (see step S10 described in FIG. 2), and the current $I_{P1}$ is integrated by the integrator circuit 22 to obtain the average voltage $V_C$ (see step S20 described in FIG. 2). Then, the difference computing circuit 23 performs subtraction operation between the reflected voltage $V_{R2}$, which is proportionally reflected from the current $I_S$ of the secondary side winding 113, and the average voltage $V_C$, to obtain the difference voltage $V_{EA}$ (see step S30 described in FIG. 2), and the pulse width modulation module 30 adjusts the duty cycle of the switch S of the flyback voltage converting circuit 10 according to the difference voltage $V_{EA}$ (see step S40 described in FIG. 2). By such a method, the output current variation of the flyback voltage converting circuit 10 may thus be effectively compensated, such that regulation of the output voltage $V_o$ is greatly promoted. The power converter 100 may thus have good voltage regulation performance in discontinuous conduction mode (DCM), continuous conduction mode (CCM), and boundary conduction mode (BCM). That is, the power converter 100 with primary-side feedback control of this invention may be applied to high-power devices (e.g., over 40 W), such as an adapter of a high-power notebook computer, and may provide a stable current and a stable voltage when the output load thereof varies.

In addition, since a response time of the current $I_{P1}$ flowing through the current sampling circuit 21 is faster than that of reflection of the current $I_s$ of the secondary side winding 113 to the second primary side winding 112 (the current $I_s$ of the secondary side winding 113 is reflected to the second primary side winding 112 according to the turns ratio between the second primary side winding 112 and the secondary side winding 113 to generate the reflected current $I_{P2}$), the current $I_{P1}$ is required to be integrated by the integrator circuit 22 of the feedback control circuit 20 for compensating the response time of reflection of the current $I_S$ of the secondary side winding 113 to the second primary side winding 112, such that a difference (difference voltage $V_{EA}$) computed by the difference computing circuit 23 has higher precision.

Figure 5:
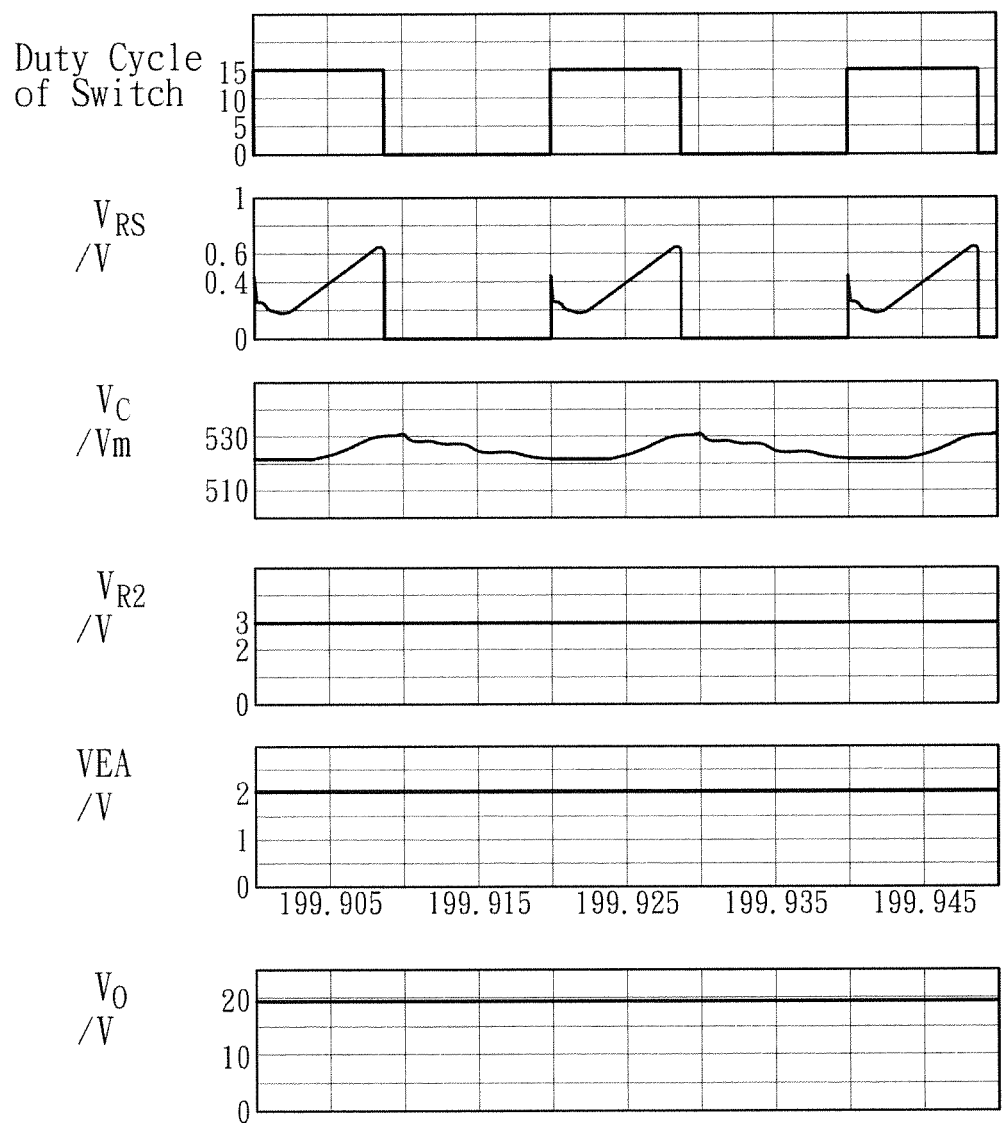
FIG. 5 is a set of timing diagrams showing waveforms from the first preferred embodiment operating under a heavy load.

Referring to FIGS. 4 and 5, waveforms of the duty cycle of the switch S, the voltage $V_{RS}$ across the sampling resistor $R_S$, the average voltage $V_C$, the reflected voltage $V_{R2}$, the difference voltage $V_{EA}$ and the output voltage $V_o$ are shown therein in the cases of a light load and a heavy load, respectively, wherein the vertical axis represents voltage and the horizontal axis represents time. The results show that, from the waveforms, in the case of the light load (see FIG. 4), the current $I_S$ of the secondary side winding 113 is smaller, the current $I_{P1}$ of the first primary side winding 111 is smaller, and the voltage $V_{RS}$ across the sampling resistor $R_S$ is smaller. The average voltage $V_C$ obtained by the integrator circuit 22 is smaller due to the smaller voltage $V_{RS}$, resulting in a larger difference voltage $V_{EA}$, such that the pulse width modulation module 30 reduces the duty cycle of the switch S to stabilize the output voltage $V_o$. In contrast, in the case of the heavy load (see FIG. 5), the current $I_S$ of the secondary side winding 113 is larger, the current $I_{P1}$ of the first primary side winding 111 is larger, and the voltage $V_{RS}$ across the sampling resistor $R_S$ is larger. The average voltage $V_C$ obtained by the integrator circuit 22 is larger due to the larger voltage $V_{RS}$, resulting in a smaller difference voltage $V_{EA}$, such that the pulse width modulation module 30 increases the duty cycle of the switch S to stabilize the output voltage $V_o$.

Figure 6:
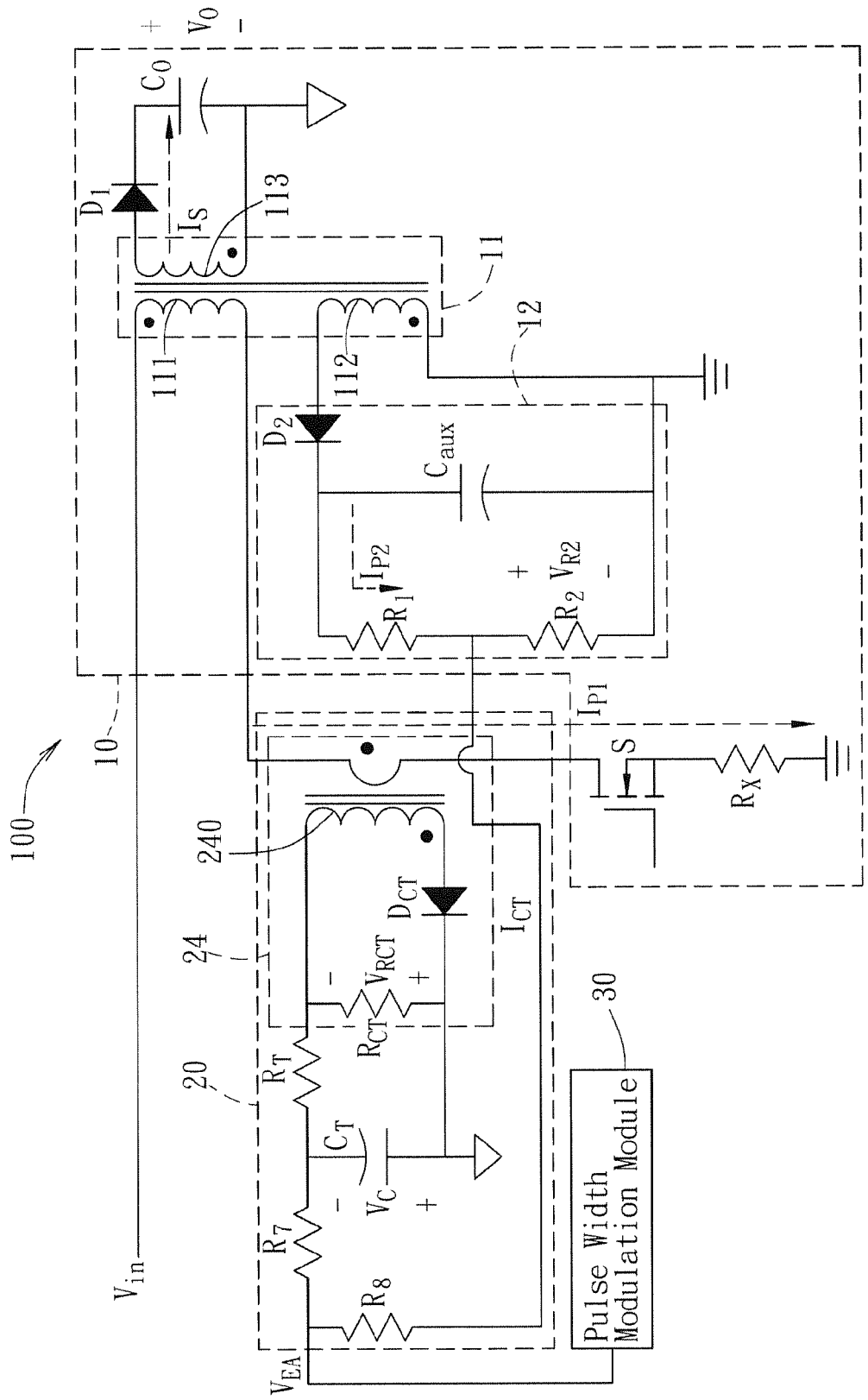
FIG. 6 is a schematic circuit diagram of a second preferred embodiment of the power converter according to the present invention.

Referring to FIGS. 2 and 6, the second preferred embodiment of the power converter 100 is shown therein. In this embodiment, the power converter 100 includes a flyback voltage converting circuit 10 and a feedback control circuit 20, in which the flyback voltage converting circuit 10 has an architecture similar to that of the first preferred embodiment (see FIG. 3). In the second preferred embodiment, a biasing resistor $R_X$ is used to replace the sampling resistor $R_s$ of the first preferred embodiment. The biasing resistor $R_X$ has a first terminal coupled to the source terminal (second terminal) of the switch S, and a grounded second terminal. It should be noted that the biasing resistor $R_X$ may be omitted in other embodiments.

The feedback control circuit 20 of this embodiment includes a current transformer (CT) 24, a converter resistor $R_T$, an energy storage capacitor $C_T$, a seventh resistor $R_7$, and an eighth resistor $R_8$. In the second preferred embodiment, the current transformer 24 is used to replace the difference computing circuit 23 of the first preferred embodiment to simplify circuit design and to achieve better reliability.

The current transformer 24 includes an induction circuit 240, a current transforming resistor $R_{CT}$, and a current transforming diode $D_{CT}$. The induction circuit 240 is used for sensing the current $I_{P1}$ of the first primary side winding 111 (i.e., the current flowing through the switch S) to generate an induced current $I_{CT}$. The current transforming resistor $R_{CT}$ has a first terminal coupled to a terminal of the induction circuit 240, and a grounded second terminal. The current transforming diode $D_{CT}$ has an anode coupled to another terminal of the induction circuit 240, and a grounded cathode.

The converter resistor $R_T$ has a first terminal coupled to the first terminal of the current transforming resistor $R_{CT}$, and a second terminal. The energy storage capacitor $C_T$ has a first terminal coupled to the second terminal of the converter resistor $R_T$, and a grounded second terminal. The seventh resistor $R_7$ has a first terminal coupled to the second terminal of the converter resistor $R_T$, and a second terminal coupled to the pulse width modulation module (PWM) 30. The eighth resistor $R_8$ has a first terminal coupled to the second terminal of the seventh resistor $R_7$, and a second terminal coupled to the connection point between the first resistor $R_1$ and the second resistor $R_2$ for receiving the reflected voltage $V_{R2}$.

Therefore, the induction circuit 240 of the current transformer 24 is used to sense the current $I_{P1}$ of the first primary side winding 111 to generate the induced current $I_{CT}$ (see step S10 described in FIG. 2), and the induced current $I_{CT}$ flows through the current transforming resistor $R_{CT}$ to obtain a negative voltage $V_{RCT}$. Then, the voltage $V_{RCT}$ is integrated to obtain an average voltage $V_C$ having a negative value (see step S20 described in FIG. 2). Based on designs of the seventh resistor $R_7$, the eighth resistor $R_8$, and superposition theorem, the reflected voltage $V_{R2}$ of the second primary side winding 112 is added to the negative average voltage $V_C$ across the energy storage capacitor $C_T$, so as to obtain the difference voltage $V_{EA}$ (see step S30 described in FIG. 2), and the pulse width modulation module 30 adjusts the duty cycle of the switch S of the flyback voltage converting circuit 10 according to the difference voltage $V_{EA}$ (see step S40 described in FIG. 2). The output current variation of the flyback voltage converting circuit 10 may thus be effectively compensated, such that regulation of the output voltage $V_o$ is greatly promoted. The difference voltage $V_{EA}$ satisfies the following equation:

$$V_{EA} = V_{R2} \times \frac{R7}{R7+R8} + (-V_C) \times \frac{R8}{R7+R8}$$

Figure 7:
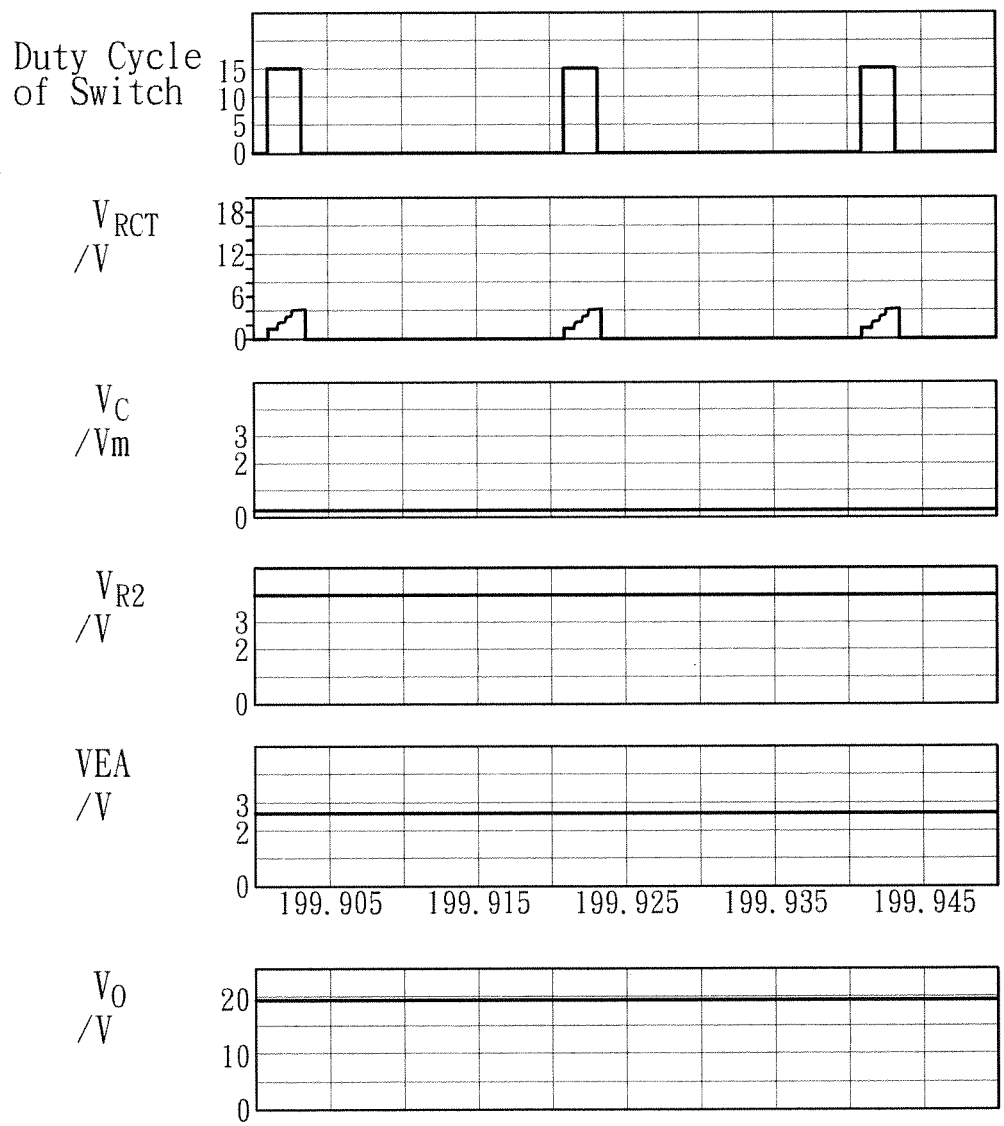
FIG. 7 is a set of timing diagrams showing waveforms from the second preferred embodiment operating under a light load.
Figure 8:
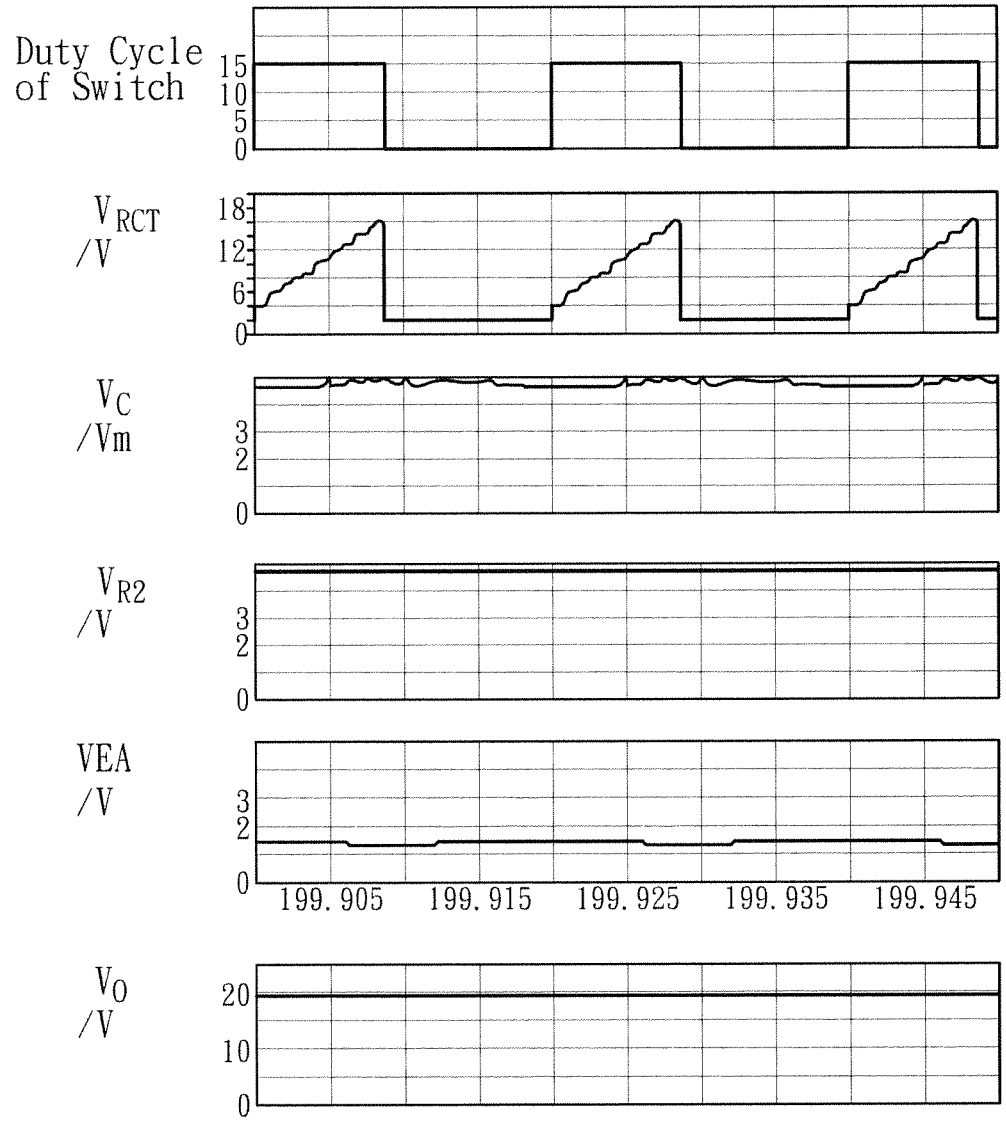
FIG. 8 is a set of timing diagrams showing waveforms from the second preferred embodiment operating under a heavy load.

Further referring to FIGS. 7 and 8, waveforms of the duty cycle of the switch S, the voltage $V_{RCT}$ across the current transforming resistor $R_{CT}$, the average voltage $V_C$, the reflected voltage $V_{R2}$, the difference voltage $V_{EA}$ and the output voltage $V_o$ are shown therein in the cases of a light load and a heavy load, respectively, wherein the vertical axis represents voltage and the horizontal axis represents time. In the case of the light load (see FIG. 7), the current $I_S$ of the secondary side winding 113 is smaller, the current $I_{P1}$ of the first primary side winding 111 is smaller, and the voltage $V_{RCT}$ which results from the induced current $I_{CT}$ that flows through the current transforming resistor $R_{CT}$ is smaller. The average voltage $V_C$ obtained from the energy storage capacitor $C_T$ has a smaller magnitude due to the smaller voltage $V_{RCT}$, resulting in a larger difference voltage $V_{EA}$, such that the pulse width modulation module 30 reduces the duty cycle of the switch S to stabilize the output voltage $V_o$. In contrast, in the case of the heavy load (see FIG. 8), the current $I_S$ of the secondary side winding 113 is larger, the current $I_{P1}$ of the first primary side winding 111 is larger, and the voltage $V_{RCT}$ which results from the induced current $I_{CT}$ that flows through the current transforming resistor $R_{CT}$ is larger. The average voltage $V_C$ obtained from the energy storage capacitor $C_T$ has a larger magnitude due to the larger voltage $V_{RCT}$, resulting in a smaller difference voltage $V_{EA}$, such that the pulse width modulation module 30 increases the duty cycle of the switch S. Therefore, this embodiment also effectively compensates output current variation of the flyback voltage converting circuit 10, and regulation of the output voltage is greatly promoted.

Figure 9:
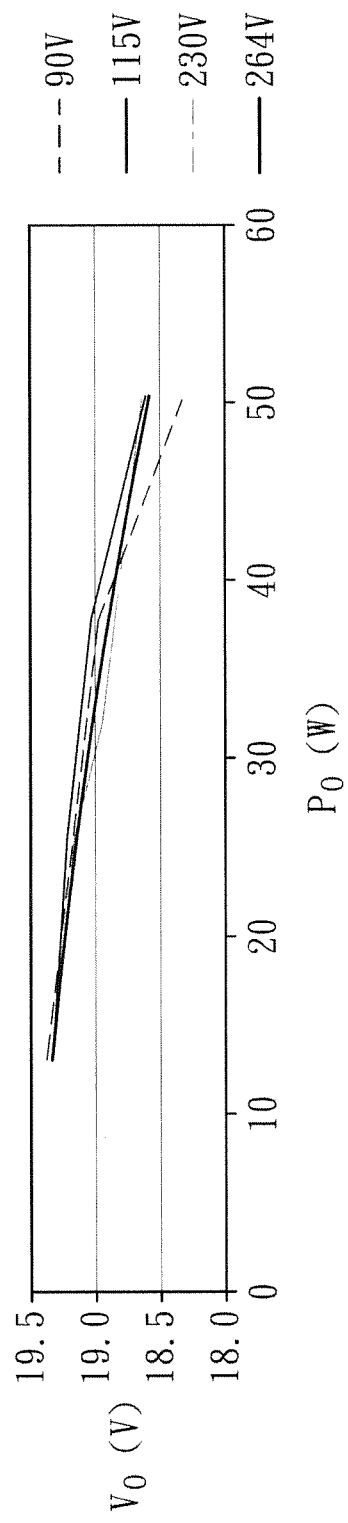
FIG. 9 is a plot showing voltage variation curves of the present invention operating in boundary conduction mode with different input voltages.

Referring to FIG. 9, voltage variation curves of the power converter 100 with primary feedback control of the abovementioned two embodiments are shown under boundary conduction mode with the input voltage $V_{in}$ being at 90, 115, 230 and 264 volts, wherein the horizontal axis represents output power $P_o$ and the vertical axis represents output voltage $V_o$. Through proper control of the switch S by the pulse width modulation module 30, voltage regulations under the input voltage $V_{in}$ of 90, 115, 230 and 264 volts with 25%, 50%, 75% and 100% load are listed in the following Table 1. This proves that under various loads and input voltages $V_{in}$, the power converter 100 may keep voltage regulation within 5%.

TABLE 1

| Vin | 25% load | 50% load | 75% load | 100% load | Regulation |
| --- | --- | --- | --- | --- | --- |
| 90 | 19.38 | 19.23 | 18.97 | 18.33 | −3.51% |
| 115 | 19.33 | 19.22 | 19.03 | 18.61 | −2.06% |
| 230 | 19.33 | 19.16 | 18.95 | 18.64 | −1.92% |
| 264 | 19.34 | 19.14 | 18.92 | 18.58 | −2.22% |

Figure 10:
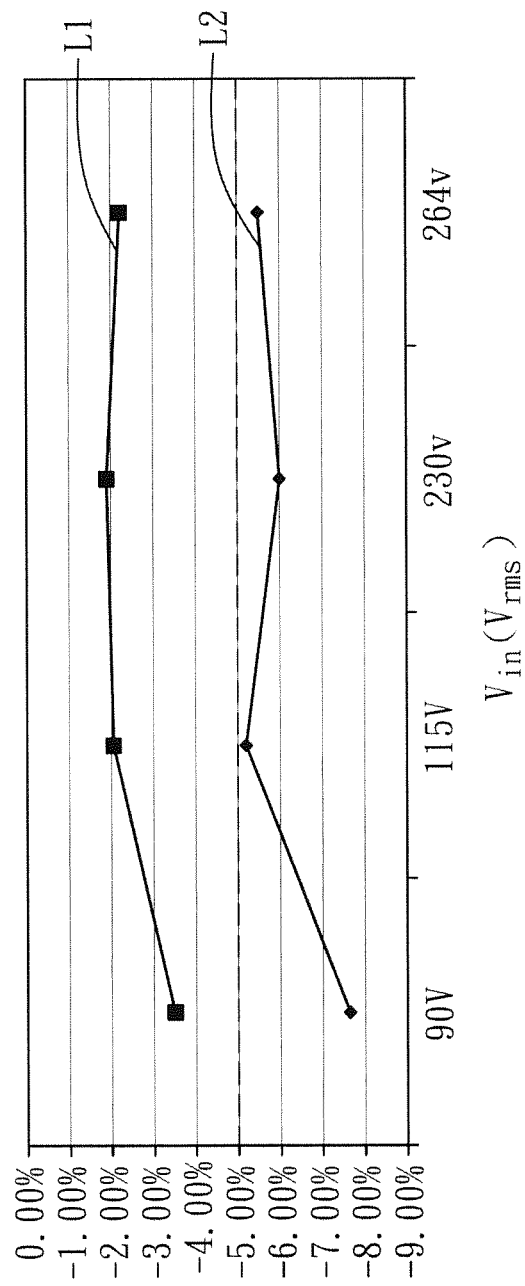
FIG. 10 is a plot showing voltage regulation curves of the present invention and the conventional power converter without primary-side feedback control when operating in boundary conduction mode.

Referring to FIG. 10, voltage regulation curves of the power converters with (present invention) and without (conventional) primary side feedback control under boundary conduction mode are shown, respectively, wherein the curve L1 is the regulation curve of the power converter 100 with primary-side feedback control according to the present invention, and the curve L2 is the regulation curve of the conventional power converter without primary-side feedback control. The results show that, from the curves L1 and L2, voltage regulation is improved from 7.67% (power converter without primary-side feedback control) to 3.51% (power converter 100 with primary-side feedback control), which means that the feedback control circuit 20 effectively compensates output current variation of the flyback voltage converting circuit 10, and greatly promotes regulation of the output voltage $V_o$.

Figure 11:
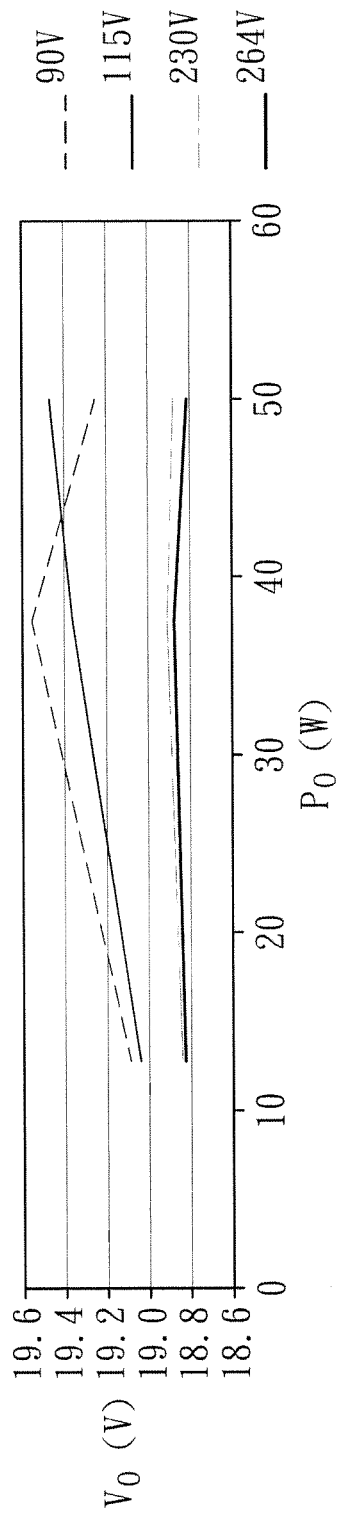
FIG. 11 is a plot showing voltage variation curves of the present invention operating in continuous conduction mode with different input voltages.

Referring to FIG. 11, voltage variation curves of the power converter 100 with primary-side feedback control of the abovementioned two embodiments are shown under continuous conduction mode with the input voltage $V_{in}$ being at 90, 115, 230 and 264 volts, wherein the horizontal axis represents output power $P_o$ and the vertical axis represents output voltage $V_o$. Through proper control of the switch S by the pulse width modulation module 30, voltage regulations under the input voltage $V_{in}$ of 90, 115, 230 and 264 volts with 25%, 50%, 75% and 100% load are listed in the following Table 2. This proves that under various loads and input voltages $V_{in}$, the power converter 100 may keep voltage regulation within 5%.

TABLE 2

| Vin | 25% load | 50% load | 75% load | 100% load | Regulation |
| --- | --- | --- | --- | --- | --- |
| 90 | 19.09 | 19.32 | 19.55 | 19.24 | +2.90% |
| 115 | 19.04 | 19.19 | 19.36 | 19.46 | +2.44% |
| 230 | 18.84 | 18.88 | 18.91 | 18.88 | −0.85% |
| 264 | 18.82 | 18.84 | 18.87 | 18.81 | −1.01% |

Figure 12:
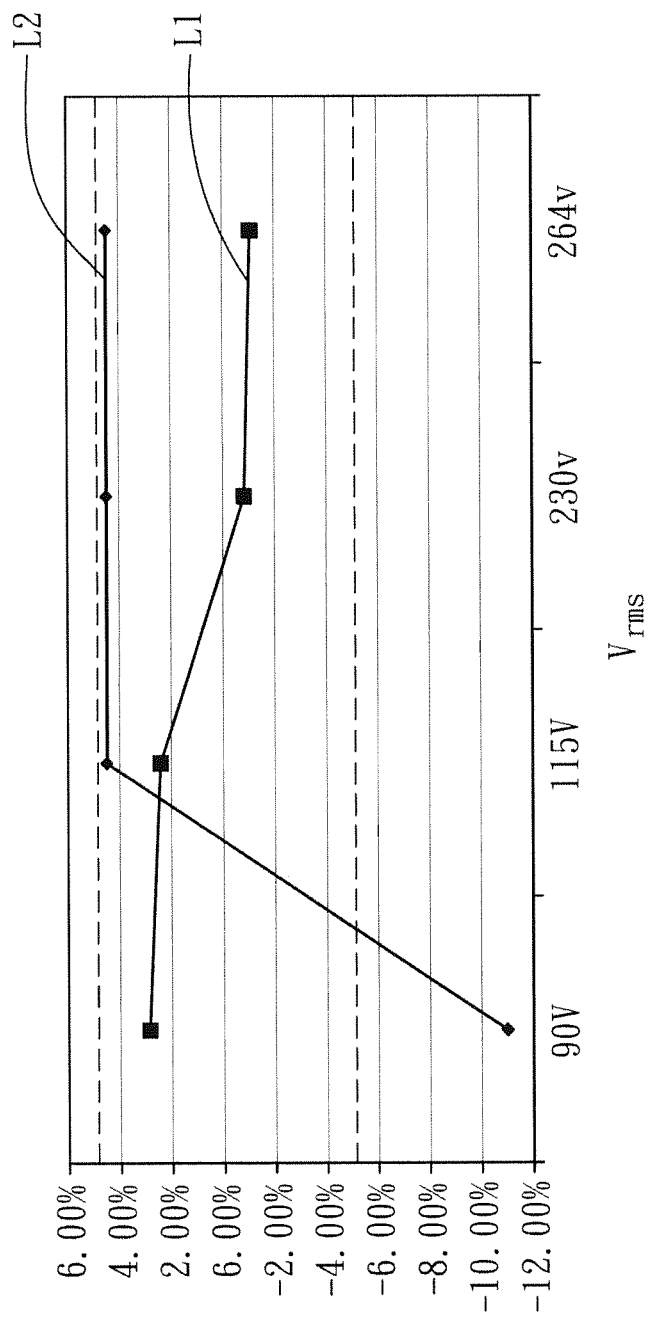
FIG. 12 is a plot showing voltage regulation curves of the present invention and the conventional power converter without primary-side feedback control when operating in continuous conduction mode.

Referring to FIG. 12, voltage regulation curves of the power converters with (present invention) and without (conventional) primary side feedback control under continuous conduction mode are shown, respectively, wherein the curve L1 is the regulation curve of the power converter 100 with primary-side feedback control according to the present invention, and the curve L2 is the regulation curve of the conventional power converter without primary-side feedback control. It is evident that, from the curves L1 and L2, voltage regulation is improved from 10.89% (power converter without primary-side feedback control) to 2.90% (power converter 100 with primary-side feedback control), which means that the feedback control circuit 20 effectively compensates output current variation of the flyback voltage converting circuit 10, and greatly promotes regulation of the output voltage $V_o$.

To sum up, the voltage control method of this invention acquires variation of the output voltage $V_o$ since the current $I_S$ of the secondary side winding 113 is proportionally reflected to the second primary side winding 112, and the difference voltage $V_{EA}$ is obtained by comparing the reflected voltage $V_{R2}$ of the second primary side winding 112 and the average voltage $V_C$ which is obtained by integrating the current $I_{P1}$ acquired from the first primary side winding 111, so that the pulse width modulation module 30 is able to adjust the duty cycle of the switch S of the flyback voltage converting circuit 10 according to the difference voltage $V_{EA}$ for effectively compensating output current variation of the flyback voltage converting circuit 10 and greatly promoting regulation of the output voltage $V_o$. In addition, the present invention uses induced current compensation via the primary side feedback control circuit, so that the power converter with primary-side feedback control is able to operate in continuous conduction mode, discontinuous conduction mode, or boundary conduction mode, and the applicable power range is expanded to 40 W-120 W. Furthermore, the present invention also achieves simplification of circuit design, reduction of required cost and area, and promotion of circuit reliability.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A voltage control method for a power converter that includes a transformer circuit, the transformer circuit including a first primary side winding, a second primary side winding and a secondary side winding, comprising:
   a) establishing a voltage corresponding to a current of the first primary side winding of the power converter;
   b) integrating the voltage established in step a) to obtain an average voltage associated with the current in the first primary side winding;
   c) comparing the average voltage obtained in step b) with a reflected voltage associated with a current of the secondary side winding of the transformer circuit; and
   d) adjusting a duty cycle of a switch of the power converter based on a comparison result obtained in step c) for adjustment of an output voltage of the power converter.

2. The voltage control method as claimed in claim 1, wherein, in step c), a subtraction operation is performed between the reflected voltage and the average voltage to obtain a difference voltage that serves as the comparison result, and in step d), the duty cycle of the switch of the power converter is adjusted according to the difference voltage.

3. The voltage control method as claimed in claim 2, wherein a current of the second primary side winding of the transformer circuit, which is proportional to the current of the secondary side winding of the transformer circuit, flows through a resistor so as to generate the reflected voltage.

4. The voltage control method as claimed in claim 1, wherein the average voltage obtained in step b) has a negative value; in step c), the average voltage is added to the reflected voltage to obtain a difference voltage that serves as the comparison result; and in step d), the duty cycle of the switch of the power converter is adjusted according to the difference voltage.

5. The voltage control method as claimed in claim 4, wherein a current of the second primary side winding of the transformer circuit, which is proportional to the current of the secondary side winding of the transformer circuit, flows through a resistor so as to generate the reflected voltage.

6. A power converter, comprising:
   a flyback voltage converting circuit including:
      a transformer circuit including a first primary side winding, a second primary side winding, and a secondary side winding, said first primary side winding having a first terminal disposed to receive an input voltage;
      a first diode having an anode coupled to said secondary side winding, and a cathode;
      an output capacitor having a first terminal coupled to said cathode of said first diode, and a grounded second terminal;
      a switch having a first terminal coupled to a second terminal of said first primary side winding, a second terminal, and a control terminal; and
      an output voltage sampling circuit coupled to said second primary side winding for receiving a reflected current of said second primary side winding, which is proportional to a current of said secondary side winding, and generating a reflected voltage corresponding to the reflected current;
   a feedback control circuit coupled to said flyback voltage converting circuit and configured to acquire and integrate a voltage corresponding to a current flowing through said first primary side winding as a result of the input voltage to obtain an average voltage, and to compare the average voltage with the reflected voltage to obtain a comparison result; and a pulse width modulation module coupled to said feedback control circuit for receiving the comparison result therefrom and configured to adjust a duty cycle of said switch based on the comparison result for adjustment of an output voltage of said power converter.

7. The power converter as claimed in claim 6, wherein said feedback control circuit includes:
   a current sampling circuit coupled to said second terminal of said switch for receiving the current flowing through said first primary side winding and generating said voltage corresponding thereto;
   an integrator circuit coupled to said current sampling circuit and configured to integrate the voltage corresponding to the current received by said current sampling circuit to generate the average voltage; and
   a difference computing circuit coupled to said integrator circuit and said output voltage sampling circuit to receive the averaged voltage and the reflected voltage respectively therefrom, and configured to generate a difference voltage that is based on a difference between the reflected voltage and the average voltage, that serves as the comparison result, and that is provided to said pulse width modulation module, said pulse width modulation module adjusting the duty cycle of said switch based on the difference voltage.

8. The power converter as claimed in claim 7, wherein said current sampling circuit includes a sampling resistor having a first terminal coupled to said second terminal of said switch, and a grounded second terminal.

9. The power converter as claimed in claim 7, wherein said integrator circuit includes a first operational amplifier, an auxiliary resistor and an integrator capacitor, said first operational amplifier having a first terminal coupled to said current sampling circuit, a second terminal, and an output terminal coupled to said second terminal thereof, said auxiliary resistor having a first terminal coupled to said output terminal of said first operational amplifier, and a second terminal, said integrator capacitor having a first terminal coupled to said second terminal of said auxiliary resistor, and a grounded second terminal.

10. The power converter as claimed in claim 6, wherein said output voltage sampling circuit includes: a second diode having an anode coupled to said second primary side winding, and a cathode; an auxiliary capacitor having a first terminal coupled to said cathode of said second diode, and a grounded second terminal; a first resistor having a first terminal coupled to said cathode of said second diode, and a second terminal; and a second resistor having a first terminal coupled to said second terminal of said first resistor, and a grounded second terminal, the reflected voltage being across said second resistor.

11. The power converter as claimed in claim 10, wherein said difference computing circuit includes: a second operational amplifier having a first terminal, a second terminal and an output terminal; a third resistor having a first terminal coupled to said integrator circuit to receive the average voltage, and a second terminal coupled to said second terminal of said second operational amplifier; a fourth resistor coupled between said second terminal and said output terminal of said second operational amplifier; a fifth resistor having a first terminal coupled to a connection point of said first and second resistors for receiving the reflected voltage, and a second terminal coupled to said first terminal of said second operational amplifier; and a sixth resistor having a first terminal coupled to said first terminal of said second operational amplifier, and a grounded second terminal.

12. The power converter as claimed in claim 11, wherein said fifth and third resistors have the same resistance, and said sixth and fourth resistors have the same resistance.

13. The power converter as claimed in claim 12, wherein a ratio between the difference of the reflected voltage and the average voltage and the difference voltage is associated with said third and fourth resistors.

14. The power converter as claimed in claim 6, wherein said feedback control circuit includes: a current transformer for sensing the current flowing through said first primary side winding to generate an induced current; a converter resistor having a first terminal coupled to said current transformer, and a second terminal; an energy storage capacitor having a first terminal coupled to said second terminal of said converter resistor, and a grounded second terminal; a seventh resistor having a first terminal coupled to said second terminal of said converter resistor, and a second terminal; and an eighth resistor having a first terminal coupled to said second terminal of said seventh resistor, and a second terminal coupled to said output voltage sampling circuit for receiving the reflected voltage.

15. The power converter as claimed in claim 14, wherein said current transformer includes: an induction circuit for sensing the current flowing through said first primary side winding to generate the induced current; a current transforming resistor having a first terminal coupled to a terminal of said induction circuit, and a grounded second terminal; and a current transforming diode having an anode coupled to another terminal of said induction circuit, and a grounded cathode.

16. The power converter as claimed in claim 15, wherein said induction circuit allows the induced current to flow through said current transforming resistor to obtain a negative voltage, said feedback control circuit integrating the negative voltage to obtain the average voltage which is negative, and generating a difference voltage that serves as the comparison result by adding the reflected voltage and the negative average voltage through said seventh and eighth resistors, said pulse width modulation module adjusting the duty cycle of said switch based on the difference voltage.

17. The power converter as claimed in claim 14, wherein said flyback voltage converting circuit further includes a biasing resistor having a first terminal coupled to said second terminal of said switch, and a grounded second terminal.

18. The power converter as claimed in claim 6, wherein a ratio between the reflected current and the current flowing through said secondary side winding is associated with a ratio of a number of turns of wire in said secondary side winding to a number of turns of wire in said second primary side winding.

* * * * *